United States Patent
Trimble et al.

(10) Patent No.: US 12,211,066 B2
(45) Date of Patent: *Jan. 28, 2025

(54) CUSTOMIZATION OF MESSAGE DELIVERY TIME BASED ON CONSUMER BEHAVIOR

(71) Applicant: Bytedance Inc., Wilmington, DE (US)

(72) Inventors: Chris Trimble, San Francisco, CA (US); Sean O'Brien, Freemont, CA (US); Geetha Kakarlapudi, San Francisco, CA (US)

(73) Assignee: Bytedance Inc., Wilmington, DE (US)

( * ) Notice: Subject to any disclaimer, the term of this patent is extended or adjusted under 35 U.S.C. 154(b) by 517 days.

This patent is subject to a terminal disclaimer.

(21) Appl. No.: 17/445,552

(22) Filed: Aug. 20, 2021

(65) Prior Publication Data

US 2022/0044280 A1 Feb. 10, 2022

Related U.S. Application Data

(63) Continuation of application No. 13/839,102, filed on Mar. 15, 2013, now Pat. No. 11,127,041.

(Continued)

(51) Int. Cl.
  *G06Q 30/0251* (2023.01)
  *G06Q 30/02* (2023.01)
  *G06Q 30/0242* (2023.01)

(52) U.S. Cl.
  CPC ......... *G06Q 30/0251* (2013.01); *G06Q 30/02* (2013.01); *G06Q 30/0242* (2013.01);
  (Continued)

(58) Field of Classification Search
  CPC .................................. G06Q 30/0207–30/0277
  (Continued)

(56) References Cited

U.S. PATENT DOCUMENTS 4,212,231 A * 7/1980 Penick ...................... G09F 1/06
  493/379
6,029,195 A * 2/2000 Herz ................ H04N 21/25891
  348/E7.071

(Continued)

FOREIGN PATENT DOCUMENTS

WO 02/41209 A1 5/2002
WO 2014/004810 A2 1/2014

OTHER PUBLICATIONS

Manuel Castells; Mireia Fernandez-Ardèvol; Jack Linchuan Qiu; Araba Sey, "Communication and Mobility in Everyday Life," in Mobile Communication and Society: A Global Perspective, MIT Press, 2007, pp. 77-126. (Year: 2007).*

(Continued)

*Primary Examiner* — Gautam Ubale
(74) *Attorney, Agent, or Firm* — Alston & Bird LLP

(57) ABSTRACT

A system and method is provided for determining when an electronic correspondence is reviewed by a consumer, and referencing this information when generating a subsequent electronic correspondence. The information may be used to determine when to send the subsequent electronic correspondence to the consumer. For example, the subsequent correspondence may be sent at the same time of day as when the consumer is determined to have previously reviewed an electronic correspondence. The information may also be used to determine what to include in the subsequent electronic correspondence. For example, time-sensitive promotions that are selected based on the information identifying the previous time at which the consumer reviewed a previous electronic correspondence, may be included in the subsequent electronic correspondence.

17 Claims, 5 Drawing Sheets

Related U.S. Application Data

(60) Provisional application No. 61/666,556, filed on Jun. 29, 2012.

(52) U.S. Cl.
CPC ..... *G06Q 30/0254* (2013.01); *G06Q 30/0255* (2013.01); *G06Q 30/0264* (2013.01); *G06Q 30/0271* (2013.01)

(58) Field of Classification Search
USPC .......................................................... 705/14
See application file for complete search history.

(56) References Cited

U.S. PATENT DOCUMENTS

| | | | |
|---|---|---|---|
| 6,336,099 B1 | 1/2002 | Barnett et al. | |
| 6,415,262 B1* | 7/2002 | Walker | G06Q 30/0239 |
| | | | 705/14.27 |
| 6,915,271 B1 | 7/2005 | Meyer et al. | |
| 6,922,672 B1 | 7/2005 | Hailpern et al. | |
| 7,225,143 B1* | 5/2007 | Kepecs | G06Q 30/0235 |
| | | | 705/14.27 |
| 7,251,617 B1* | 7/2007 | Walker | G06Q 30/0231 |
| | | | 705/16 |
| 7,809,601 B2 | 10/2010 | Shaya et al. | |
| 7,899,866 B1* | 3/2011 | Buckingham | H04L 51/212 |
| | | | 709/206 |
| 8,271,328 B1 | 9/2012 | Baltz et al. | |
| 8,359,238 B1 | 1/2013 | Kauchak et al. | |
| 8,583,484 B1 | 11/2013 | Chalawsky et al. | |
| 8,666,812 B1* | 3/2014 | Gandhi | G06Q 30/02 |
| | | | 705/14.52 |
| 8,738,434 B1* | 5/2014 | Rodriguez | G06Q 30/0282 |
| | | | 705/7.31 |
| 8,762,201 B1* | 6/2014 | Noonan | G06Q 30/0241 |
| | | | 705/14.41 |
| 9,231,897 B1 | 1/2016 | Liden | |
| 10,535,076 B1 | 1/2020 | Thacker et al. | |
| 11,030,647 B2 | 6/2021 | Aggarwal et al. | |
| 11,080,754 B1 | 8/2021 | Han et al. | |
| 11,539,657 B2* | 12/2022 | Rapaport | H04L 67/306 |
| 2001/0032247 A1 | 10/2001 | Kanaya | |
| 2002/0007356 A1* | 1/2002 | Rice | G06N 5/04 |
| | | | 706/47 |
| 2002/0032602 A1* | 3/2002 | Lanzillo, Jr. | G06Q 30/06 |
| | | | 705/14.66 |
| 2002/0062245 A1 | 5/2002 | Niu et al. | |
| 2002/0161664 A1 | 10/2002 | Shaya et al. | |
| 2002/0161779 A1 | 10/2002 | Brierley et al. | |
| 2003/0018780 A1 | 1/2003 | Kawashima | |
| 2003/0055721 A1* | 3/2003 | Beery, II | G06Q 30/0601 |
| | | | 705/26.1 |
| 2003/0105664 A1 | 6/2003 | Van Luchene | G07C 15/005 |
| | | | 705/14.13 |
| 2003/0208399 A1 | 11/2003 | Basak et al. | |
| 2004/0032393 A1* | 2/2004 | Brandenberg | G06F 16/9535 |
| | | | 707/E17.11 |
| 2004/0054574 A1* | 3/2004 | Kaufman | G06Q 30/0258 |
| | | | 705/14.56 |
| 2004/0088363 A1 | 5/2004 | Doemling et al. | |
| 2004/0103024 A1 | 5/2004 | Patel et al. | |
| 2004/0122730 A1* | 6/2004 | Tucciarone | H04L 12/1859 |
| | | | 705/14.66 |
| 2004/0123314 A1* | 6/2004 | Bova | H04N 21/8586 |
| | | | 348/E7.054 |
| 2005/0075932 A1* | 4/2005 | Mankoff | G06Q 30/0258 |
| | | | 705/14.57 |
| 2005/0228719 A1* | 10/2005 | Roberts | G06Q 30/0261 |
| | | | 705/14.66 |
| 2006/0090185 A1* | 4/2006 | Zito | H04N 21/44224 |
| | | | 348/E7.073 |
| 2006/0135233 A1 | 6/2006 | Willis et al. | |
| 2006/0136545 A1 | 6/2006 | Reistad et al. | |
| 2006/0178932 A1* | 8/2006 | Lang | G06Q 30/02 |
| | | | 705/14.73 |
| 2007/0055565 A1 | 3/2007 | Baur et al. | |
| 2007/0055569 A1 | 3/2007 | Subramanian et al. | |
| 2007/0061195 A1 | 3/2007 | Liu et al. | |
| 2007/0083433 A1 | 4/2007 | Lawe | |
| 2007/0112920 A1 | 5/2007 | Hay | |
| 2007/0150342 A1 | 6/2007 | Law et al. | |
| 2008/0015936 A1* | 1/2008 | Bibelnieks | G06Q 30/0277 |
| | | | 705/14.43 |
| 2008/0015938 A1 | 1/2008 | Haddad et al. | |
| 2008/0027787 A1 | 1/2008 | Malsbenden et al. | |
| 2008/0033811 A1* | 2/2008 | Brown | G06Q 30/02 |
| | | | 705/14.66 |
| 2008/0103909 A1* | 5/2008 | Huang | G06Q 30/02 |
| | | | 705/14.27 |
| 2008/0154714 A1* | 6/2008 | Liu | G06Q 30/0236 |
| | | | 705/14.36 |
| 2008/0160956 A1 | 7/2008 | Jackson et al. | |
| 2008/0201643 A1 | 8/2008 | Nagaitis et al. | |
| 2008/0202889 A1* | 8/2008 | Breitenbach | G07F 17/42 |
| | | | 194/217 |
| 2008/0208787 A1* | 8/2008 | Luchene | G06Q 30/0224 |
| | | | 706/47 |
| 2008/0229244 A1* | 9/2008 | Markus | G06F 16/2471 |
| | | | 715/811 |
| 2008/0262928 A1* | 10/2008 | Michaelis | G06Q 30/02 |
| | | | 705/14.39 |
| 2009/0030798 A1* | 1/2009 | Otto | G06Q 30/06 |
| | | | 705/26.1 |
| 2009/0047946 A1 | 2/2009 | Sato et al. | |
| 2009/0048926 A1* | 2/2009 | Salesky | G06Q 20/10 |
| | | | 705/14.13 |
| 2009/0063274 A1* | 3/2009 | Dublin, III | G06Q 30/02 |
| | | | 705/14.1 |
| 2009/0125321 A1* | 5/2009 | Charlebois | G06Q 30/0281 |
| | | | 705/346 |
| 2009/0138328 A1* | 5/2009 | Higgins | G06Q 30/0207 |
| | | | 705/14.1 |
| 2009/0144201 A1* | 6/2009 | Gierkink | G06Q 30/0246 |
| | | | 705/40 |
| 2009/0150218 A1* | 6/2009 | Brunner | G06Q 30/0261 |
| | | | 705/14.58 |
| 2009/0164296 A1 | 6/2009 | Phan | |
| 2009/0216579 A1* | 8/2009 | Zen | G06Q 30/0207 |
| | | | 705/14.1 |
| 2009/0265229 A1* | 10/2009 | Sidhu | G06Q 30/02 |
| | | | 705/26.1 |
| 2009/0265763 A1* | 10/2009 | Davies | H04L 51/224 |
| | | | 709/206 |
| 2009/0271266 A1* | 10/2009 | Regmi | G06Q 30/0244 |
| | | | 707/999.107 |
| 2009/0313109 A1* | 12/2009 | Bous | G06Q 30/02 |
| | | | 705/26.1 |
| 2010/0004997 A1* | 1/2010 | Mehta | G06Q 30/0269 |
| | | | 705/14.66 |
| 2010/0057586 A1* | 3/2010 | Chow | G06Q 30/0623 |
| | | | 705/26.1 |
| 2010/0076832 A1* | 3/2010 | Cha | G06Q 30/0225 |
| | | | 705/14.36 |
| 2010/0088157 A1 | 4/2010 | Wilson | |
| 2010/0091677 A1* | 4/2010 | Griff | H04L 41/22 |
| | | | 370/252 |
| 2010/0250359 A1* | 9/2010 | Gillenson | G06Q 30/0224 |
| | | | 348/150 |
| 2010/0262461 A1* | 10/2010 | Bohannon | G06Q 40/03 |
| | | | 705/26.1 |
| 2010/0299209 A1 | 11/2010 | Mehta et al. | |
| 2010/0318407 A1 | 12/2010 | Leff et al. | |
| 2010/0318418 A1 | 12/2010 | Wertheimer et al. | |
| 2011/0016161 A1* | 1/2011 | Loeb | G06F 16/9535 |
| | | | 715/745 |
| 2011/0029363 A1 | 2/2011 | Gillenson et al. | |
| 2011/0040609 A1* | 2/2011 | Hawkins | G06Q 30/02 |
| | | | 705/1.1 |
| 2011/0055001 A1 | 3/2011 | Mattern et al. | |

(56) References Cited

U.S. PATENT DOCUMENTS

| | | | |
|---|---|---|---|
| 2011/0066692 A1* | 3/2011 | Ciancio-Bunch | H04L 51/234 709/206 |
| 2011/0078026 A1* | 3/2011 | Durham | G06Q 30/02 705/14.66 |
| 2011/0184813 A1 | 7/2011 | Barnes et al. | |
| 2011/0184937 A1 | 7/2011 | Jin | |
| 2011/0191176 A1* | 8/2011 | Merriman | G06Q 30/0257 705/14.49 |
| 2011/0208578 A1 | 8/2011 | Bergh et al. | |
| 2011/0208585 A1 | 8/2011 | Daboll et al. | |
| 2011/0225034 A1 | 9/2011 | Bayat | |
| 2011/0231321 A1* | 9/2011 | Milne | G06Q 30/00 705/14.66 |
| 2011/0238501 A1* | 9/2011 | Almeida | G06Q 30/0273 705/14.69 |
| 2011/0246297 A1 | 10/2011 | Buchalter et al. | |
| 2011/0246306 A1* | 10/2011 | Blackhurst | G06Q 30/0261 705/14.66 |
| 2011/0276373 A1* | 11/2011 | Juszczak | G06Q 30/0211 705/14.15 |
| 2011/0282964 A1* | 11/2011 | Krishnaswamy | G06Q 30/02 709/217 |
| 2011/0288921 A1* | 11/2011 | King | G06Q 30/02 705/347 |
| 2011/0302025 A1* | 12/2011 | Hsiao | G06Q 30/0256 705/14.42 |
| 2011/0313840 A1* | 12/2011 | Mason | H04W 4/029 705/14.35 |
| 2012/0022944 A1* | 1/2012 | Volpi | G06Q 30/0207 705/14.1 |
| 2012/0042025 A1 | 2/2012 | Jamison et al. | |
| 2012/0054020 A1 | 3/2012 | Jacobs | |
| 2012/0054031 A9 | 3/2012 | Walker et al. | |
| 2012/0101881 A1* | 4/2012 | Taylor | G06Q 30/04 705/14.36 |
| 2012/0116840 A1 | 5/2012 | Omer | |
| 2012/0130817 A1 | 5/2012 | Bousaleh et al. | |
| 2012/0143666 A1* | 6/2012 | Carrion | G06Q 30/02 705/14.23 |
| 2012/0158494 A1* | 6/2012 | Reis | G06Q 30/0241 705/14.49 |
| 2012/0158875 A1* | 6/2012 | Almeida | H04L 67/01 709/206 |
| 2012/0166267 A1* | 6/2012 | Beatty | G06Q 30/0219 705/14.46 |
| 2012/0166433 A1* | 6/2012 | Tseng | G06Q 30/0267 707/E17.005 |
| 2012/0179551 A1* | 7/2012 | Georgakis | G06Q 30/00 705/14.64 |
| 2012/0191530 A1* | 7/2012 | Williams | G06Q 30/0277 705/14.42 |
| 2012/0209673 A1* | 8/2012 | Park | G06Q 30/02 705/14.15 |
| 2012/0209686 A1* | 8/2012 | Horowitz | G06Q 30/0224 705/14.26 |
| 2012/0259702 A1* | 10/2012 | Zhang | G06Q 30/0254 705/14.54 |
| 2012/0265597 A1 | 10/2012 | Saha et al. | |
| 2012/0265646 A1 | 10/2012 | Ghadialy et al. | |
| 2012/0278172 A1* | 11/2012 | Mercuri | G06Q 30/02 705/14.58 |
| 2012/0290383 A1* | 11/2012 | Busch | G06Q 30/02 705/14.58 |
| 2012/0316949 A1* | 12/2012 | Chen | G06Q 30/02 705/14.26 |
| 2012/0330735 A1* | 12/2012 | Gasparine | G06Q 30/02 705/14.16 |
| 2012/0330741 A1* | 12/2012 | Cruz | G06Q 30/0214 705/14.31 |
| 2013/0013545 A1* | 1/2013 | Agarwal | G06F 16/9537 706/46 |
| 2013/0024298 A1 | 1/2013 | Irvine et al. | |
| 2013/0073381 A1* | 3/2013 | Binkley | G06Q 30/02 705/14.48 |
| 2013/0073388 A1* | 3/2013 | Heath | G06Q 50/01 705/14.53 |
| 2013/0085804 A1 | 4/2013 | Leff et al. | |
| 2013/0124299 A1 | 5/2013 | Montgomery et al. | |
| 2013/0132183 A1* | 5/2013 | Klein | G06Q 30/0207 705/14.36 |
| 2013/0132365 A1 | 5/2013 | Chang et al. | |
| 2013/0159192 A1* | 6/2013 | Partridge | G06Q 30/02 705/14.1 |
| 2013/0173393 A1 | 7/2013 | Calman et al. | |
| 2013/0179264 A1 | 7/2013 | Wilson | |
| 2013/0238425 A1 | 9/2013 | Saldanha et al. | |
| 2013/0290141 A1* | 10/2013 | Bhaskar | G06Q 30/0603 705/26.61 |
| 2013/0290503 A1 | 10/2013 | Rajkumar et al. | |
| 2013/0332277 A1* | 12/2013 | Faith | G06Q 30/0222 705/14.54 |
| 2013/0346170 A1* | 12/2013 | Epstein | G06Q 30/0226 705/14.14 |
| 2014/0006129 A1 | 1/2014 | Heath | |
| 2014/0006139 A1 | 1/2014 | Aggarwal et al. | |
| 2014/0040007 A1* | 2/2014 | Relyea, Jr. | G06Q 30/0242 705/14.57 |
| 2014/0095324 A1 | 4/2014 | Cabral et al. | |
| 2014/0120864 A1 | 5/2014 | Manolarakis et al. | |
| 2014/0122238 A1 | 5/2014 | Lewis et al. | |
| 2014/0171039 A1* | 6/2014 | Bjontegard | H04L 67/535 455/414.1 |
| 2014/0180817 A1* | 6/2014 | Zilkha | G06F 16/24575 705/14.55 |
| 2018/0012195 A1* | 1/2018 | Nagaraj | G06Q 10/1095 |
| 2020/0290467 A1* | 9/2020 | Gao | H04B 5/79 |

OTHER PUBLICATIONS

Collective Attention and the Dynamics of Group Deals (Year: 2011).*
Revitalizing_the_Ps_of_E-Marketing_with_Customer_Experience_Management (Year: 2012).*
Affiliate_internet_marketing_Concept_and_application_analysis (Year: 2010).*
Do_Links_Matter_An_Investigation_of_the_Impact_of_Consumer_Feedback_Recommendation_Networks_and_Price_Bundling_on_Sales (Year: 2012).*
Analysis_of_the_Actual_Response_Rates_in_Mobile_Advertising (Year: 2006).
P3-coupon_A_probabilistic_system_for_Prompt_and_Privacy-preserving_electronic_coupon_distribution (Year: 2011).
A Multimethod Approach to Evaluating Social Media Campaign Effectiveness (Year: 2013).
Periodic Email Prompts to Re-Use an Internet-Delivered Computer-Tailored Lifestyle Program: Influence of Prompt Content and Timing (Year: 2013).
Targeted Advertising for the Communication Service Provider (Year: 2010).
Advisory Action for U.S. Appl. No. 13/838,452, dated Jul. 20, 2016, 8 pages.
Anonymous, Advertisement System, Method and Computer Program Product, ip.com, Published Jul. 24, 2006.
Anshin, Peter et al., "Developing an Index for Measuring the Engagement of Internet Media"; 2008 IEEE International Conference on Systems, Man and Cybernetics (SMC 2008); dated (2008); pp. 2182-2190.
Authors et al., "WI-OC-P Just-In-Time Promotion with Dynamic Adjustments Responsive to Customer Behavior", IP.com, dated (Mar. 6, 2009).
Byers et al., "Daily Deals Prediction, Social Diffusion, and Reputational Ramifications" dated (Sep. 7, 2011).
Dow et al., A Location-based Mobile Advertisement Publishing System for vendors 2011 Eighth International Conference on Information Technology: New Generations, Feng Chia Univ., Taichung, Taiwan (downloaded May 11, 2021).

(56) References Cited

OTHER PUBLICATIONS

Drossos et al., "An Empirical Assessment of Factors that Influence the Effectiveness of SMS Advertising", Proceedings of the 40th Hawaii International Conference on System Sciences, dated (2007).
Extended European Search Report from corresponding European Patent Application No. 13739541.4 dated Dec. 11, 2015.
International Search Report and Written Opinion for Application No. PCT/US2013/048154 dated Dec. 1, 2014.
Jun et al., Design of Tag Match Advertising System and the evaluation of the business model, IEEE Asisa-Pacific Services Computing Conference, Feb. 2008.
PCT International Preliminary Report on Patentability for application PCT/US2013/048154 issued Dec. 31, 2014.
Rapleaf "The Consumer Data Marketplace" www.rapleaf.com/under-the-hood/ retrieved on May 7, 2013. (Year: 2013).
Supplementary European Search Report from corresponding European Patent Application No. 13739541.4 dated Jan. 8, 2016.
U.S. Application entitled "Sales Enhancement System", U.S. Appl. No. 13/460,745.
U.S. Application filed Mar. 15, 2013; first named inventor: Li, U.S. Appl. No. 13/838,415.
U.S. Application filed Mar. 2, 2012; first named inventor: O'Brien, U.S. Appl. No. 13/411,502.
U.S. Patent Application filed Jan. 31, 2013, In re: Thacker entitled "entitled Pre-Feature Promotion System", U.S. Appl. No. 13/756,145.
U.S. Patent Application filed Mar. 15, 2013, In re: Aggarwal entitled "Cadence Management System for Consumer Promotions", U.S. Appl. No. 13/838,711.
U.S. Patent Application filed Mar. 15, 2013, In re: Li entitled "Promotion Offering System Analyzing Collection of Promotions", U.S. Appl. No. 13/838,415.
U.S. Patent Application filed Mar. 15, 2013, In re: Trimble entitled "Customization of Message Delivery Time Based on Consumer Behavior", U.S. Appl. No. 13/839,102.
U.S. Patent Application filed Mar. 2, 2012, In re: O'Brien entitled "Relevance System for Consumer Deals", U.S. Appl. No. 13/411,502.
U.S. Provisional Application entitled "Promotion Offering System Analyzing Collections of Promotions", U.S. Appl. No. 61/663,508.
Forecasting_and_analysis_of_marketing_data_using_neural_networks_a_case_of_advertising_and_promotion_impact (Year: 1995).
To_Send_or_Not_to_Send_An_Empirical_Assessment_of_Error_Reporting_Behavior (Year: 2008).

\* cited by examiner

CUSTOMIZATION OF MESSAGE DELIVERY TIME BASED ON CONSUMER BEHAVIOR

REFERENCE TO RELATED APPLICATION

This application is a continuation of U.S. Non-Provisional application Ser. No. 13/839,102, filed Mar. 15, 2013, which claims the benefit of priority of U.S. Provisional Application No. 61/666,556, titled "Inbox Management," and filed Jun. 29, 2012, the entirety of each of which is hereby incorporated herein by reference.

The present description relates to offering promotions associated with a product or a service. This description more specifically relates to generating an electronic correspondence that includes at least one promotion and presenting the electronic correspondence to a consumer.

DESCRIPTION OF THE RELATED ART

Merchants typically offer promotions to consumers from time to time in order to generate more business. The promotions offered may be in the form of discounts, deals, rewards or the like. Often times, a promotional offering may be presented to a consumer in the form of an electronic correspondence that is transmitted at certain times throughout a given time period (e.g. throughout the day).

SUMMARY OF THE INVENTION

An apparatus and method for determining when electronic correspondence is reviewed by a consumer, and using this information when sending subsequent electronic correspondence.

According to an aspect, a method for transmitting an electronic correspondence is provided. The method includes: receiving feedback data indicating a time associated with previous electronic correspondence, the time related to when the previous electronic correspondence was reviewed or the time related to purchase of a promotion listed within the previous electronic correspondence; analyzing the feedback data; determining a transmission time to transmit subsequent electronic correspondence to the consumer based on the analysis of the feedback data; generating the subsequent electronic correspondence to include at least one promotion; and transmitting the subsequent electronic correspondence to the consumer at the transmission time.

According to another aspect, an apparatus for transmitting an electronic correspondence is provided. The apparatus includes: a memory configured to store at least one promotion; and a processor. The processor is configured to: receive feedback data indicating a time associated with previous electronic correspondence, the time related to when the previous electronic correspondence was reviewed or the time related to purchase of a promotion listed within the previous electronic correspondence; analyze the feedback data; determine a transmission time to transmit a subsequent electronic correspondence to the consumer based on the analysis of the feedback data; generate the subsequent electronic correspondence to include at least one promotion; and transmit the subsequent electronic correspondence to the consumer at the transmission time.

According to yet another aspect, a method for transmitting electronic correspondence is provided. The method includes: receiving feedback data indicating times at which electronic correspondence communicated via a plurality of different types of communication channels were previously reviewed by a consumer; analyzing the feedback data; determining a transmission time (such as a present time or a predetermined future time) to transmit a subsequent electronic correspondence to the consumer; selecting a type of communication channel, from the plurality of different types of communication channels, to send the subsequent electronic communication based on the analysis of the feedback data; generating the subsequent electronic correspondence based on the selected type of communication channel; and transmitting the subsequent electronic correspondence to the consumer at the transmission time via the selected type of communication channel.

According to still another aspect, an apparatus for transmitting an electronic correspondence is provided. The apparatus includes: a memory configured to store feedback data indicating times at which electronic correspondence communicated via a plurality of different types of communication channels were previously reviewed by a consumer; and a processor in communication with the memory. The processor is configured to: analyze the feedback data; determine a transmission time to transmit a subsequent electronic correspondence to the consumer; select a type of communication channel, from the plurality of different types of communication channels, to send the subsequent electronic communication based on the analysis of the feedback data; generate the subsequent electronic correspondence based on the selected type of communication channel; and transmit the subsequent electronic correspondence to the consumer at the transmission time via the selected type of communication channel.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
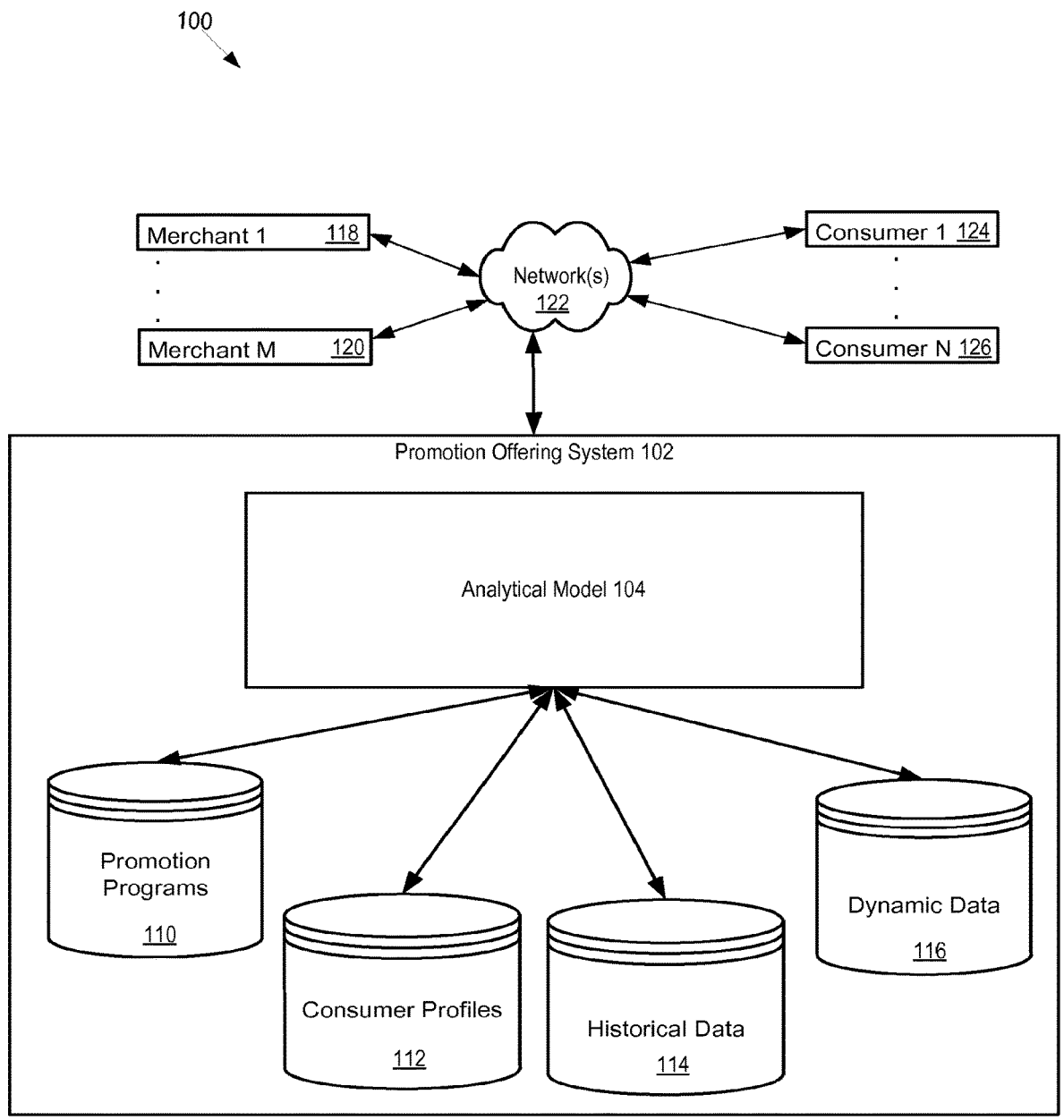
FIG. 1 illustrates a representation of a network and a plurality of devices that interact with the network to achieve an analysis of an electronic correspondence or a plurality of electronic correspondences.

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. It should be noted that promotions and deals are recited in this disclosure to be understood as being interchangeable, unless specifically stated otherwise.

A promotion may include any type of reward, discount, coupon, credit, deal, voucher or the like used toward part (or all) of the purchase of a product or a service. The promotion may be offered as part of a larger promotion program, or the promotion may be offered as a stand-alone one-time promotion.

In an effort to better distinguish and identify the promotion, the promotion may include one or more attributes, such as the merchant offering the promotion (e.g., "XYZ coffee shop), the location of the promotion, the amount of the promotion, the category of the promotion (such as a restaurant promotion, a spa promotion, a travel promotion, a local promotion, etc.), the subcategory of the promotion (such as a sushi restaurant), amount of discount offered by the promotion, time at which the promotion is likely to be purchased by a consumer (e.g., a breakfast meal promotion may have a greater likelihood of being purchased by a consumer in the morning time), time at which the promotion is redeemable (e.g., a breakfast meal promotion may only be redeemable during breakfast hours), time or time period for which the promotion is related to (e.g., a breakfast meal promotion is related to a morning time period), or the like.

A consumer may have an associated profile with one or more attributes. The consumer attributes may include, but are not limited to, the consumer's name, consumer's age, consumer's address, consumer's occupation, consumer's educational background, consumer's previously accepted and/or rejected promotion program offerings, consumer's gender and the like.

In addition to the consumer's attributes, the consumer's profile may include one or more sub-profiles. For instance, the consumer may have a work sub-profile, a home sub-profile, or other sub-profile(s). The work sub-profile may include the consumer's work address. Likewise, the home sub-profile may include the consumer's home address. Further, other sub-profile(s) may include address or locations that the consumer will be or frequents. The home sub-profile may have associated with it a time period during which the consumer is known, or predicted, to be at home. Similarly, the work sub-profile may have associated with it a time period during which the consumer is known, or predicted, to be at work. The home and work consumer sub-profiles have been provided for illustrative purposes only. Other consumer sub-profiles are contemplated.

As discussed in more detail below, a promotion offering system 102 as illustrated in FIG. 1 may offer one or more promotions to a consumer at a given time, or at multiple times during a time period. A time period may be a number of hours, a given day, week, month, year or any other describable time period. In the case where multiple promotions are offered to the consumer at a given time, the promotion offering system 102 may offer groupings of promotions in the form of promotion collections (such as offering in a single electronic correspondence, 3 or more promotions selected from a promotion collection). Examples of promotion collections may include, without limitation, local promotions (e.g., promotions that are geographically proximate to the consumer), short term exclusive promotions, travel themed promotions, specific goods promotions (e.g., electronics, beauty products, sports goods, etc.), service deals, activity deals and holiday themed promotions. In this way, the promotion offering system 102 may determine which promotion(s), or group(s) of promotions, to offer to a consumer. Examples of grouping promotions into promotion collections are disclosed in U.S. Provisional Patent Application No. 61/663,508, incorporated by reference in its entirety. Going forward, all subsequent mention of a promotion may be interchangeable with a promotion collection.

The one or more promotions that are offered to the consumer may be presented to the consumer in an electronic correspondence. The electronic correspondence may take the form of an email, SMS text message, webpage inbox message, VOIP voice message, real-time webpage content presentation, mobile push notifications or other similar types of electronic correspondences. For illustrative purposes only, the following disclosure describes the electronic correspondence being presented to the consumer in the form of an email or other push-type electronic communication that is transmitted to the consumer. However, any type of electronic correspondence is contemplated. In addition, while the email may be described as including a single promotion, it is contemplated that one or more promotions, or promotion collections, may be included in the email transmitted to the consumer.

Each type of electronic correspondence may be presented to the consumer via a respective communication channel. For example, an electronic correspondence in the form of an email may be transmitted to the consumer via an email communication channel.

As another example, an electronic correspondence in the form of a presentation of search results corresponding to a search criteria inputted by the consumer into a search protocol may be presented to the consumer via a webpage type of communication channel.

Another example may be a mobile application type of communication channel. For a mobile application type of communication channel, the consumer may access a device executing the mobile application. The mobile application may allow the consumer to access and interact with the promotion system 100. For instance, the mobile application may be executed on the device in order to allow the consumer to receive electronic correspondences on the device, and also allow the consumer to search for promotions in the promotion system 100 on the device. The mobile application may be natively installed on the device, or may alternatively be downloaded on the device from an external server. The device may be a mobile device communications device.

The three types of communication channels described above are provided for exemplary purposed only, as other types of communication channels are also contemplated for the present invention.

Like the promotion attributes and the consumer attributes, each electronic correspondence may be associated with one or more electronic correspondence attributes. The electronic correspondence attributes may include, but are not limited to, a type of electronic correspondence (e.g., email, SMS text message, webpage inbox message, VOIP voice message, real-time webpage content presentation, mobile push notifications, etc.), a position within an electronic correspondence for assigning a promotion, look or appearance of the electronic correspondence, time at which an electronic correspondence was previously transmitted to a consumer, time at which an electronic correspondence is contemplated for current presentation to a consumer, or the like.

There are several ways in which to present an electronic correspondence to a consumer. The promotion offering system 102 may send the electronic correspondence to the consumer at a time determined independently of the consumer. For example, the time to send the email to the consumer may be a predetermined time that is the same for all consumers (or the same for a subset of all of the consumers).

Alternatively, the time at which to send the email may be dependent on at least one aspect of the consumer. For example, the time at which to send the email may be dependent on email habits or actions of the consumer, such as when the consumer typically opens his or her emails (or accesses his or her email account). More specifically, the promotion offering system 102 may select the time at which to send the email in order for the email to have a target position in the inbox of the consumer's email account. For example, the promotion offering system 102 may select the time at which to send the email at the same time as (or at a time just prior to) when the consumer typically opens his or her email so that email is at or near the top of the consumer's email account, as discussed in more detail below.

As an alternate example, the time at which to send the email may be dependent on the purchasing habits of the consumer. In one instance, the timing of sending the electronic correspondence may be selected based on the time(s) at which the consumer purchases promotions. For example, based on analysis of the feedback data from multiple previous electronic correspondence sent, a most frequent time of purchase may be determined. More specifically, the times of purchase for some or all the previous purchases of the consumer may be analyzed to determine that a time of day (such as a specific time of 5:00 PM or a time range of 5:00 PM-7:00 PM) is when the consumer most typically purchases promotions. Thus, the time to send the electronic correspondence may be selected at or just prior to the most frequent time of purchase at which the consumer purchases promotions, such as at 4:45 PM or at 5:00 PM. In another instance, the send times for multiple electronic correspondences may be analyzed to determine, based on the consumer's purchases from the multiple electronic correspondence, the send time when the consumer purchased the most promotions. For example, previous electronic correspondence may be sent to the consumer at various times throughout the day, such as in the morning, in the afternoon, and in the evening. Feedback data may be generated which indicates when a previous electronic correspondence was sent and correlated thereto, a result of sending the promotion (e.g., whether a promotion was purchased from the electronic correspondence). The feedback data may be analyzed to determine a most frequent transmission time for purchase, whereby the most frequent transmission time for purchase comprises the time of transmission that results in the most consumer purchases. The most frequent transmission time may be a discrete time (such as 9:00 AM) or a time range (such as 9:00 AM-11:00 AM). In this regard, the feedback data may be analyzed to determine the most frequent transmission time for purchase (e.g., transmission in the morning results in more overall purchases).

As still an alternate example, the time at which to send the email may be dependent on the reviewing habits of the consumer, such as by determining when the consumer typically accesses a link contained within the electronic correspondence.

In addition, the promotion offering system 102 may determine the habits of the consumer for one or more of the types of communication channels, and send subsequent electronic communication via the types accordingly. For example, the promotion offering system 102 may determine the times at which the consumer typically opens his or her email (and/or the email send times that most likely result in a purchase of a promotion therein), the times at which the consumer typically opens his or her SMS text messages (and/or the SMS text message send times that most likely result in a purchase of a promotion therein), the times at which the consumer typically accesses the promotion system server in order to receive real-time webpage content presentation, etc. As another example, one or more attributes of the consumer may be used in order to select one or more similar customers and select the time at which to send the email from the similar customer(s). More specifically, attributes such as the location of the consumer (e.g., home location or work location) or demographic information of the consumer (e.g., age, gender, etc.) may be accessed. Consumer profile(s) with similar attributes may be accessed to determine the time at which to send the email (or other electronic communication). Using feedback from similar consumers may be beneficial when a consumer has newly registered, and therefore does not have feedback data himself or herself. After the consumer generates sufficient feedback data, the time at which to send the email may be determined exclusively using the consumer's feedback, or determined using both the consumer's feedback and feedback of similarly situated consumers.

In response to determining the times of accessing/opening or purchasing of a type of communication via the different communication channels, the promotion offering system 102 may select the time at which to send the electronic communication at the same time as (or at a time just prior to) when the consumer typically opens or accesses the respective type of electronic communication and/or when the consumer typically receives the respective type of electronic communication that results in a purchase of a promotion listed therein, as discussed in more detail below.

Further, in response to determining the times of accessing/opening of or purchasing from a type of communication, the promotion offering system 102 may select one or more aspects of the communication. As one example, the promotion offering system 102 may select the type of communication for sending the electronic communication via the respective communication channel. More specifically, in response to determining that an electronic communication is to be sent at a predetermined time (e.g., a communication that needs to be sent as soon as possible, or a communication with a time-sensitive promotion), the promotion offering system 102 may select the type of communication and respective type of communication channel based on the determined times of accessing/opening.

For example, in the event that the promotion offering system 102 seeks for the consumer to review a promotion at 10:00 AM (e.g., a "desired access time"), the promotion offering system may determine which of the types of communication that the consumer typically accesses closest to (e.g., the type of communication that the consumer accesses closest to and prior to the desired access time), proximate to or at the desired access time (e.g., the consumer accesses his or her email account at 10:00 AM). In particular, the promotion offering system 102 may seek to include promotions for lunch. In order for the consumer to review the promotion at the desired time (2 hours before lunch), the email communication channel is selected. In response to determining the type of communication that matches the desired access time, the promotion offering system 102 may select the determined type to send the promotion to the consumer via the respective communication channel (e.g., select sending the email with the promotion via the email communication channel to the consumer). As another example, the promotion offering system 102 may desire to send a promotion to the consumer as soon as possible. In this regard, the desired time for the consumer to review the electronic communication is the present time. The present time may be defined as a particular time of day, or particular day of the week. Thus, the promotion offering system 102 may review the feedback in order to determine which type of communication that the consumer typically reviews that is closest to the particular time of day, and/or the particular day of the week (e.g., Tuesdays at 10:00 AM). The determined type of communication and the respective communication channel may then be used to send the electronic communication in order for the consumer to review the electronic communication as closely to the present time.

In a more specific implementation, in the event that the promotion offering system 102 seeks for the consumer to review a promotion at a specific desired access time, the promotion offering system 102 may access the profile of the consumer. As discussed above, the consumer profile may include sub-profiles, such as a consumer home sub-profile, a consumer work sub-profile, etc. The sub-profiles may be relevant during certain periods, such as for certain times of the day (e.g., the work sub-profile is relevant during work hours whereas the consumer sub-profile is relevant during weekday mornings and evenings and weekends), certain days of the week (e.g., the consumer work sub-profile is relevant on weekends), or the like. The promotion offering system 102 may determine, based on the desired access time, which sub-profile is relevant, and access one or more attributes associated with the sub-profile to generate the promotion to send to the consumer. For example, in the event that the desired access time is 10:00 AM on a weekday, the promotion offering system 102 may determine that based on the feedback data, the type of communication to contact the consumer is e-mail (i.e., the consumer typically accesses his or her e-mail account around 10:00 AM on weekdays). The promotion offering system 102 may thus access the sub-profile associated with the consumer at the time/date of 10:00 AM on weekdays, which is the work sub-profile, and access one or more attributes of the consumer based on the associated sub-profile (such as the location of the consumer associated with the work sub-profile). The one or more attributes of the consumer may then be used in order to provide a more relevant promotion to the consumer at the desired access time. For example, in the event that the consumer has a home sub-profile that indicates a home location of Freemont, Calif. and a work sub-profile that indicates a work location of Palo Alto, Calif., the relevant location for purposes of selecting a promotion for access at 10:00 AM on a weekday is the work location of Palo Alto, Calif. (e.g., selecting a restaurant promotion sent to the consumer at 10:00 AM on a weekday that is proximate to Palo Alto, CA is more relevant to the consumer than a promotion proximate to Freemont, CA).

In the event that the sub-profiles have communication addresses for the communication channels (e.g., a home email address associated with the home sub-profile, a work email address associated with the work sub-profile, etc.), the desired access time as designated by the promotion offering system 102 may determine which communication channel to select based on the feedback data (e.g., the e-mail communication channel), may determine the communication address associated with sub-profile for the selected communication channel, and may determine promotion(s) using one or more attributes associated with the sub-profile (e.g., work location). In this regard, the promotion offering system 102 may use the feedback data in order to determine the preferred communication channel through which to send the promotion at the desired access time (e.g., email communication channel), may select a sub-profile based on the desired access time, may determine the communication address associated with the selected sub-profile, and may determine promotion(s) to send via the preferred communication channel to the determined communication address using one or more attributes in the selected sub-profile.

In this way, the email sent to the consumer may be more likely to be reviewed in a timely manner (since the timing is selected based on the consumer's habits), and may be more likely to be reviewed at all (e.g., since the email will be at the top of the email inbox, designated as the most recently received email), thereby providing a more efficient method for presenting electronic correspondences that include promotions to the consumer.

Apart from the communication channel, determining the times of accessing/opening of or purchasing from a type of communication may affect the content of the communication. For example, the time at which the email is sent may affect the promotions contained therein. More specifically, certain promotions may be categorized based on time of day. The categorization may be an indication of when the service or goods in the promotion are typically used (e.g., a promotion for a dinner may be categorized as being used at night). Alternatively, the categorization may be an indication of when the service or goods in the promotion are more likely purchased (e.g., a goods promotion is categorized as more likely purchased at night). The categorization of the promotion may be checked against the transmission time in order to select promotions that match the sent time.

In still an alternate embodiment, the promotion offering system 102 is configured to analyze the feedback data from the consumer in order to determine a time at which promotions are opened/accessed or a time at which the promotions are purchased and at least one aspect of the promotions contained therein. The aspect of the promotions may comprise location of promotions purchased. As discussed below, a consumer may have a profile with sub-profiles. The sub-profiles may include a work sub-profile indicating a work location and a home sub-profile indicating a home location. As one example, the promotion offering system 102 may analyze the promotions purchased to determine that the promotions are more closely associated with one location in the consumer's profile (such as closer or proximate to the consumer's sub-profile home location or the consumer's sub-profile work location). In this regard, the promotion offering system 102 may analyze the history of the consumer purchases or performance of promotions sent to the consumer in order to determine to send promotions associated with a different location. More specifically, the promotion offering system 102 may analyze when promotions are purchased and analyze the promotions purchased in order to assess a commonality in the purchased promotions. For example, a consumer may purchase promotions from emails transmitted in the morning (when the consumer is presumably at his or her work location), while the promotions purchased are for another location (e.g., for a home location). As discussed herein, the determination as to timing to send the electronic communication may dictate what channel to send the electronic communication (e.g., email channel versus SMS text message channel) and may also dictate the endpoint of the electronic communication (e.g., a timing during work hours being sent to a email address designated for work). Regardless, additional analysis of the consumer's purchases may indicate that the consumer purchases promotions are associated with a different location (e.g., a home location), even though the transmission time and/or the endpoint of the electronic correspondence indicate a different location (e.g., the transmission time is during work hours and/or the endpoint is a work email address in the consumer's sub-profile). Thus, the promotion offering system 102 may select promotions based on a location different from what the timing of sending and/or the endpoint of the electronic communication indicate (e.g., select promotions proximate to the consumer's home location even though the timing of sending and/or the endpoint indicate a work location).

In yet another embodiment, either in conjunction with or not in conjunction with determining the time to send the electronic communication, the promotion offering system 102 is configured to analyze the promotions purchased by the consumer in order to assess the commonality in the purchased promotions.

The promotion offering system 102 is configured to analyze feedback data that identifies a previous time at which the consumer actually reviewed the electronic correspondence or purchased a promotion within the electronic correspondence. In one embodiment, reviewing the electronic correspondence comprises opening the electronic correspondence. The promotion offering system 102 may then rely upon this previous time information when determining a subsequent time to present the consumer with a subsequent electronic correspondence. Alternatively, the promotion offering system 102 may rely upon this previous time information when determining which type of communication to select to send the subsequent electronic correspondence to the consumer.

Continuing with the email as the electronic correspondence example, a time at which the consumer reviewed an email may correspond to the time at which the consumer opened the email. However, the description for reviewing an email may take on another meaning, as described in more detail below.

The consumer may be considered to have reviewed a previously presented email when the consumer opens the email from an inbox of an email messaging system. When the consumer opens the email, feedback data identifying that the email has been reviewed by the consumer, as well as a time the email was obtained, may be generated and transmitted to the sender of the email (e.g., promotion offering system 102).

Alternatively or in addition, the consumer may be considered to have reviewed the previously presented email when the consumer selects an object (e.g., an image, a link, a string of text, and the like) included in the email. When the consumer opens the email and selects the object, feedback data identifying that the email has been reviewed by the consumer, as well as a time the email was reviewed, may be generated and transmitted to the sender of the email (e.g., promotion offering system 102). In some embodiments, the object may be any object that is included in the email. In other embodiments, the object may be a specific object that is included in the email for the specific purpose of generating the feedback data when the specific object has been selected by the consumer. The consumer may select the object by clicking on it with an input device (e.g., mouse, touch pad, touch screen, navigation button, tracking ball, or the like). The consumer may also select the object by hovering over the object for a set length of time.

Alternatively or in addition, a consumer may be considered to have reviewed the previously presented email when the consumer agrees to transmit a confirmation back to the sender of the email. For instance, when the consumer opens the email, the email messaging system may prompt the consumer as to whether the consumer agrees to transmit a confirmation receipt of the email back to the sender of the email. If the consumer agrees, then feedback data indicating the consumer has reviewed the email, as well as a time the email was reviewed, is generated and transmitted to the sender of the email (e.g., promotion offering system 102).

Alternatively or in addition, a consumer may be considered to have reviewed the previously presented email when the consumer opens the email and an object (e.g., an image, a link, a string of text, and the like) is displayed in the email. For instance, the object to be displayed in the email may be stored in a server instead of being saved as part of the email. Thereafter, when the consumer opens the email, the object is able to be displayed in the email after the object has been obtained from the server. When it is confirmed that the object has been obtained from the server, the server may generate feedback data indicating the consumer has reviewed the email and transmit the feedback data to the sender of the email (e.g., promotion offering system 102). The feedback data may also include a time that the email was reviewed.

The specific examples for obtaining feedback data provided above are for illustrative purposes only. Other methods for obtaining feedback data indicating a time that a consumer has reviewed a previous email are contemplated.

For instance, the feedback data may be received by the analytical model 104 and used to determine when to transmit a subsequent email and/or the content of the subsequent email. For example, the analytical model 104 may reference the feedback data in order to determine a subsequent time at which to transmit an email to the consumer. Alternatively or in addition, the feedback data may be referenced when determining which promotion(s) to select for inclusion in the subsequent email to the consumer. In still an alternate embodiment, the feedback data may be reference when determining a type of communication to select in order to communicate with the consumer.

After receiving the feedback data, the feedback data may be referenced to determine a subsequent time to transmit an email to the consumer. For instance, one or more instances of feedback data may be referenced to generate a prediction as to when the consumer is expected to review or read an email. Thereafter, based on the feedback data and prediction, the promotion offering system 102 may determine when to transmit a subsequent email. Alternatively or in addition, the feedback data may be referenced when determining which promotion(s) to select for inclusion in a subsequent email to the consumer. For instance, if the feedback data indicates that the consumer is likely to review or read an email in the morning time, then the promotion offering system 102 may select promotions based on that knowledge. For example, the promotion offering system 102 may select time-sensitive promotion(s) based on the indication that the consumer reviews emails in the morning time (e.g., promotions that are available only until 1 PM). As another example, the promotion offering system 102 may select a promotion(s) based on the indication that the consumer reviews emails in the morning time, whether or not the promotion(s) is time-sensitive (e.g., breakfast meal deals without timing requirements). In still an alternate embodiment, for promotions that the promotion offering system 102 seeks review by the consumer at a predetermined time, the promotion offering system may select a type of communication based on the feedback data. For example, in the event that the feedback data indicates that one type of communication, from amongst a plurality of types of communication, is opened/accessed by the user at or around the predetermined time, the promotion offering system 102 may select the one type of communication in order to present the promotion to the consumer for the consumer's review. Further description is provided below.

FIG. 1 illustrates an overview for a promotion system 100 configured to offer promotions for promotion programs. The promotion system 100 includes a promotion offering system 102, which communicates via one or more networks 122 with consumers, such as consumer 1 (124) to consumer N (126), and with merchants, such as merchant 1 (118) to merchant M (120). The promotion offering system 102 includes an analytical model 104 that is in communication with databases 110, 112, 114, 116. The analytical model 104 may include one or more components for generating emails including one or more promotions, or promotion collections, and also assigning a position within the generated email to each of the included promotions.

The analytical model 104 may also include one or more components for analyzing received feedback data identifying times at which a consumer has previously reviewed an email including one or more promotions according to the promotion offering system 102. From this analysis, a determination may be made as to a subsequent time for transmitting a subsequent email containing promotions according to the promotion offering system 102. Further description is provided below.

In addition, based on the analyzed feedback data, the analytical model 104 may include one or more components for analyzing promotions in the promotion offering system and determining which promotions to present to the consumer in the subsequent email. In addition or alternatively, the analytical model 104 may analyze the feedback data and determine a position within the subsequent email to assign a promotion that is to be included in the email. Further description is provided below.

When analyzing the feedback data and the promotions during the generation of the subsequent email, the analytical model 104 communicates with one or more databases that are part of (or work in conjunction with) the promotion offering system 102, such as a promotion programs database 110, consumer profiles database 112, historical data database 114 and dynamic data database 116. With respect to the particular consumer for whom the feedback data relates to and for whom the subsequent email is being generated for, the analytical model 104 may access the databases 110, 112, 114 and 116 in order to obtain specific attribute information on the consumer. The analytical model 104 may also access the databases 110, 112, 114 and 116 in order to obtain specific attribute information on the various promotions in the promotion system 100 that are being considered for inclusion in the subsequent email.

The promotion programs database 110 is configured to store data detailing various promotions and promotion programs that are available for offer in the promotion offering system 102. In order to input promotion program information into the promotions program database 110, merchants may optionally communicate via the networks 122 with the promotion offering system 102 to input the information detailing the various promotion program offerings.

The consumer profiles database 112 includes profiles, and sub-profiles, for the consumers, consumer 1 (124) to consumer N (126), that are included in the promotion system 100. The attribute information detailed for a consumer stored in the consumer profiles database 112 may include, but is not limited to, name, age, address, occupation, educational background, previously accepted promotion program offerings, previously rejected promotion program offerings, gender and the like. Any one, some or all of the attributes of the consumer may be used by the promotion offering system 102 in determining whether to offer a promotion to a consumer.

The historical data database 114 includes information detailing the past performance of promotion offerings that have been presented in the promotion offering system 102 in previous times. The historical data database 114 may include, but is not limited to, rates of acceptances of specific promotion programs, attributes of consumers that accepted or rejected specific promotion programs, times at which previous emails were reviewed by a consumer, and the like.

The dynamic data database 116 includes information detailing the past performance of a promotion program offering that is currently active in the promotion offering system 102. So that, while a promotion program referenced in the dynamic data database 116 is currently active, the data stored in the dynamic data database 116 may pertain to include performance data of the active promotion program from a previous time period.

Although FIG. 1 has been illustrated to show separate databases 110, 112, 114 and 116, FIG. 1 has been illustrated for demonstrative purposes only, and it is contemplated to have the databases 110, 112, 114 and 116 arranged in any combination of one or more memories/storage units.

Any one or more of the databases may also include a repository of deals, such as disclosed in U.S. application Ser. No. 13/460,745, incorporated by reference in its entirety. Alternatively, the repository of deals may be stored separately from the databases 110, 112, 114, 116. In any case, the promotion offering system 102 may have multiple deal repositories, such as a first bank of deals in which deals are offered to consumers for a shorter period of time (such as up to 1 week) and a second bank of deals in which deals are offered to consumers for a longer period of time (such as up to 6 months). The promotion offering system 102 may also include a bank of deals that are available for presentation to a consumer at any time prior to a corresponding merchant in the promotion system 100 identifying that the bank of deals, or one or more promotions in the bank of deals, is no longer available. In this way, the number of promotions that are included in the promotion offering system 102 may increase or decrease depending on various factors such as the expiration of a promotion or a corresponding merchant identifying that a promotion is no longer available for presentation to a consumer. Further description is provided below.

Figure 2:
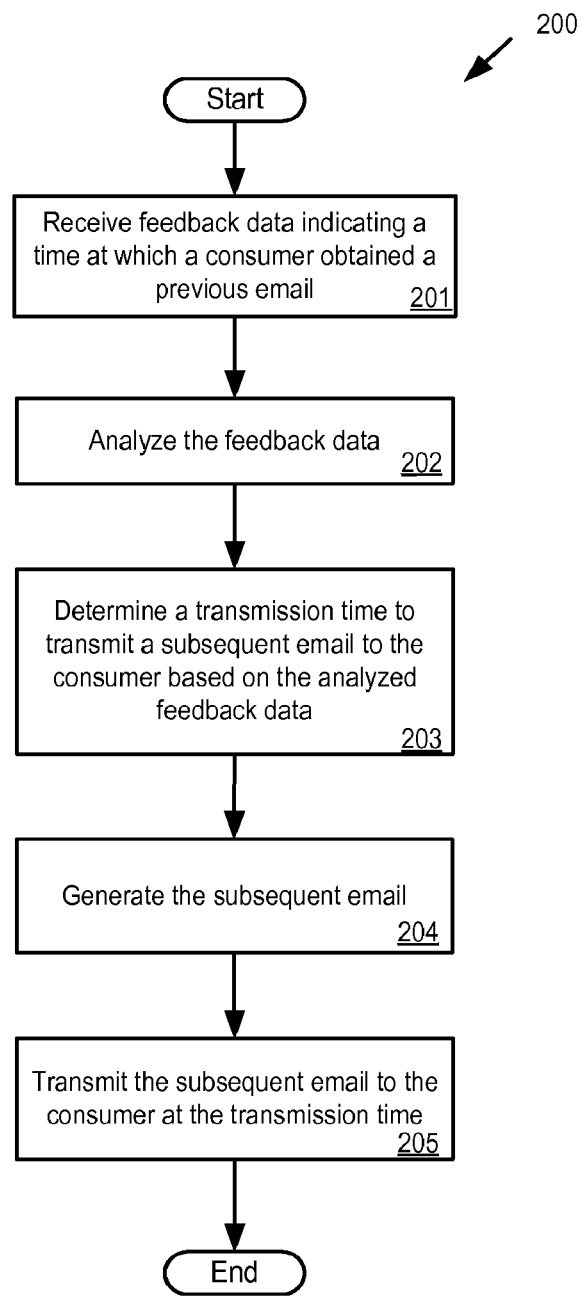
FIG. 2 illustrates a flow chart describing an overview of a process for analyzing feedback data for determining a transmission time to transmit a subsequent electronic correspondence to a consumer.

FIG. 2 illustrates a flow chart 200 describing an overview of a process for analyzing feedback data corresponding to a time at which a consumer reviewed a previously transmitted email, and utilizing the feedback data analysis to generate a subsequent email to transmit to the consumer. The flow chart 200 is described with reference to an email being transmitted for presentation to a consumer. However, other forms of electronic correspondences and their respective methods for presentation to a consumer are contemplated.

At 201, feedback data indicating a time at which a consumer reviewed a previously transmitted email to the consumer is received. The consumer may have reviewed the previous email, for example, according to any one of the methods described above. The time at which the email was previously transmitted to the consumer and the time at which the consumer reviews this same email may not be the same, as explained above.

At 202, the feedback data corresponding to the previously transmitted email to the consumer is analyzed. In addition to the information indicating the time at which the previously transmitted email was reviewed by the consumer, the feedback data may also include information identifying the promotion(s) that were included in the previously transmitted email, as well as any of the promotion(s) in the previously transmitted email that were purchased by the consumer.

At 203, a transmission time to transmit a subsequent email to the consumer is determined based on the analyzed feedback data from 202. In some embodiments, the transmission time will coincide with a time at which the previously transmitted email was reviewed by the consumer as identified by the feedback data in 202. For instance, if the feedback data indicates that the consumer reviewed the previous email at a certain time of the day, the transmission time for transmitting the subsequent email may be set to coincide with the certain time of the day. The transmission time may further be set to coincide with the same time period (e.g., day) as the time at which the consumer reviewed the pervious email, in addition to the set time (e.g., time of the day).

As previously described, the consumer may have one or more associated consumer sub-profiles. In such embodiments where the consumer is associated with more than one consumer sub-profile, the analysis at 202 may additionally include referencing the feedback data, and making a determination as to which consumer sub-profile the consumer reviewed the previously transmitted email from. For example, the consumer may have a work sub-profile and a home sub-profile. As discussed in more detail below, in the event that the feedback data indicates work hours, the analytical model 104 may note that the consumer reviews emails during work hours and may identify the appropriate consumer sub-profile (i.e., the work sub-profile). By determining the consumer sub-profile from which the consumer reviewed the previous email, the content of the subsequent email may be selected based on the identified consumer sub-profile (e.g., selecting lunch deals close to the consumer's work address when the work sub-profile is identified as the sub-profile the consumer reviews emails from).

For instance, the consumer's work sub-profile may be associated with a time period of 9:00 a.m. to 6:00 p.m. on a weekday. If the feedback data indicates that the previously transmitted email was reviewed by the consumer at a time in-between 9:00 a.m. to 6:00 p.m. on a weekday, the analysis at 202 may predict that, based on the feedback data, the more appropriate sub-profile to use when selecting the content of the subsequent email is the consumer's work sub-profile.

In addition, although the flow chart 200 is described as being applied to only an email type of electronic correspondence via an email communication channel, cross communication amongst different communication channels is contemplated. For example, by obtaining the feedback data indicating the time at which the consumer obtained the previous email at 201, at 203 a transmission time to transmit a subsequent electronic correspondence that is not an email may be determined. In this way, the transmission time that is determined based on the analyzed feedback data corresponding to a first type of electronic correspondence at 203, may correspond to a second type of electronic correspondence that is different from the first type of electronic correspondence. It follows that the subsequent generation of an electronic correspondence at 204 will be of an electronic correspondence type that matches the electronic correspondence type identified in the transmission time determined at 203.

So even though the feedback data received at 201 corresponds to a previous time the consumer received an email type of electronic correspondence, this feedback data may be referenced in order to determine a transmission time to transmit a subsequent electronic correspondence to the consumer at 203, where the subsequent electronic correspondence is not an email (e.g., webpage presentation of promotions). It also follows that the subsequent generation of an electronic correspondence at 204 may not be an email, but an electronic correspondence that corresponds to the electronic correspondence identified at 203. This may be because all types of electronic correspondences may be considered to be an impression on the consumer.

At 204, the subsequent email is generated. In some embodiments, the subsequent email may be generated to include one or more promotions that share one or more attributes with the time period corresponding to the transmission time determined at 203. In order to generate the subsequent email to include promotions that share one or more attributes with the transmission time, attributes describing the time period corresponding to the transmission time may be reviewed.

For instance, the transmission time determined at 203 may correspond to a morning time period. In this case, the morning time period may be reviewed and a determination may be made to identify morning time period related deals. Examples of morning time period related deals may include, but are not limited to, breakfast meal deals, early morning specials, coffee deals, early morning fight travel deals, or the like. In this way, the promotions that are included in the subsequent email at the transmission time that is during the morning time period may be related to the morning time period. By generating the subsequent email to include promotions that are related to the time period during which the subsequent email is transmitted to the consumer, the probability that the consumer may be interested in, and therefore purchase, the promotions may be increased.

In addition or alternatively, the promotion(s) that are selected for inclusion during the generation of the subsequent email at 204 may correspond to time-sensitive promotions that coincide with the transmission time for the subsequent email determined at 203. For instance, a promotion may be included in the subsequent email if the offer for the promotion expires shortly after the transmission time of the subsequent email. In the example discussed above in which the consumer reviews emails during the morning time period, the content of the subsequent email may include lunch time promotions which expire within a few hours from the time the email is transmitted to the consumer (e.g., at 1:00 p.m.). The time-sensitive promotion may be part of a time-sensitive promotion collection that includes promotions that are only available during a set period of time. In this way, the subsequent email may include a promotion from the time-sensitive promotion collection if the transmission time is within the set period of time.

And at 205, the subsequent email is transmitted to the consumer at the transmission time determined at 203. By transmitting the subsequent email based on the time at which the consumer previous reviewed (e.g., viewed or opened) the previous email, the likelihood that the consumer will also review the subsequent email may increase. This result is desirable to further increase the probability that the consumer will purchase a promotion that is included in the subsequent email.

Additionally, in the embodiments where the consumer is associated with more than one consumer sub-profile, the content of the subsequent email may be based on the determined sub-profile, as discussed at 202.

Figure 3:
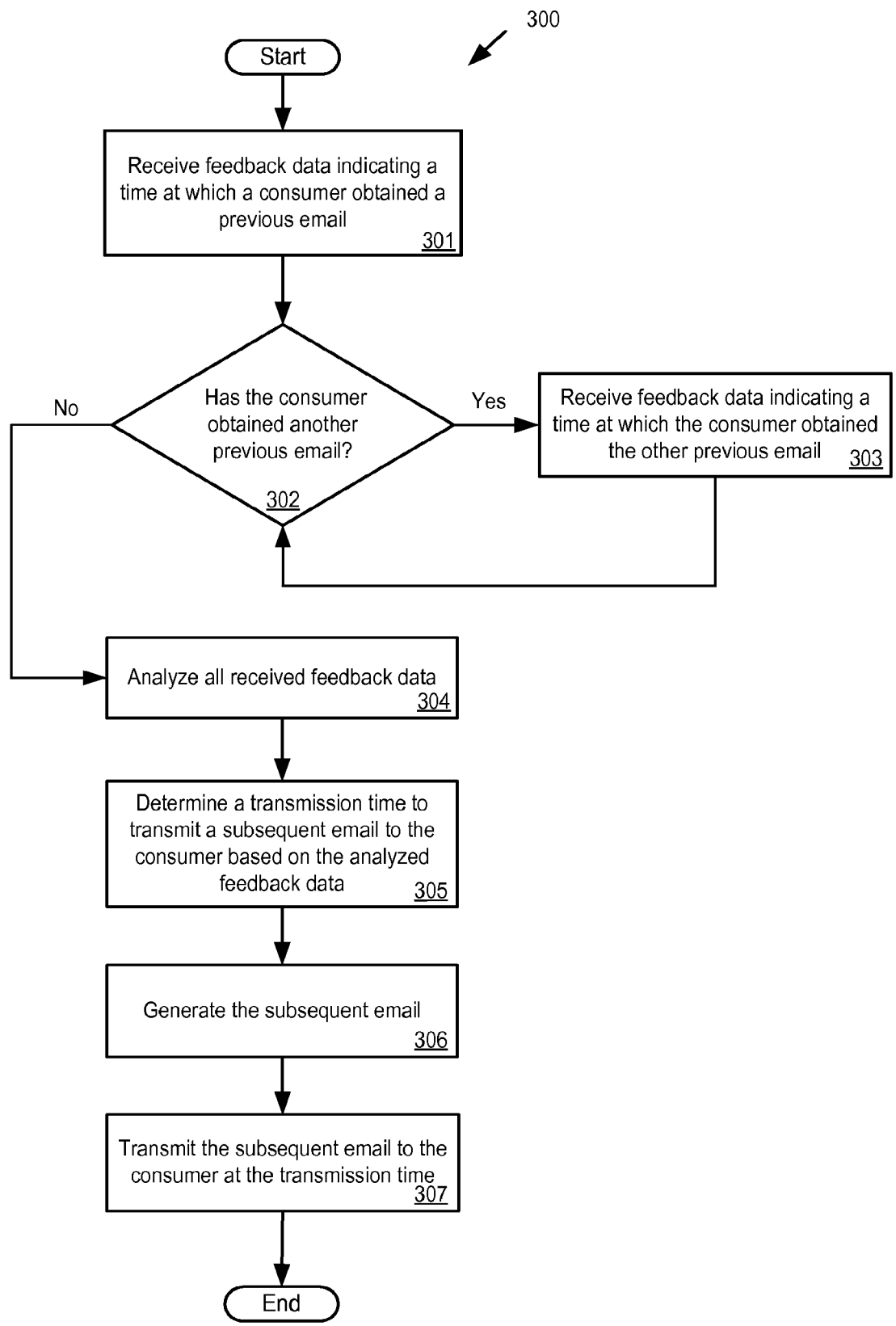
FIG. 3 illustrates a flow chart describing an overview of a process for analyzing one or more feedback data for determining a transmission time to transmit a subsequent electronic correspondence to a consumer.

FIG. 3 illustrates a flow chart 300 describing a process for analyzing one or more feedback data corresponding to a time at which a consumer reviewed a previously transmitted email(s), and utilizing the feedback data analysis to generate a subsequent email to transmit to the consumer. The flow chart 300 is described with reference to an email being transmitted for presentation to a consumer. However, other forms of electronic correspondences and their respective methods for presentation to a consumer are contemplated.

At 301, feedback data indicating a time at which a consumer reviewed a previously transmitted email to the consumer is received. The consumer may have reviewed the previous email, for example, according to any one of the methods described above. The time at which the previous email was previously transmitted to the consumer and the time at which the consumer actually reviews the previous email may not be the same, as explained above.

At 302, a determination is made as to whether the consumer has reviewed other previously transmitted emails from the promotion offering system 102. If it is determined that the consumer has reviewed another previous email, then at 303 the feedback data indicating the time at which the consumer reviewed the other previous email is received. The determination at 302 is reiterated until all previous feedback data is received. Although flow chart 300 illustrates 302 as a separate determination as to whether another previous email has been reviewed by the consumer, the process may alternatively receive feedback data as the consumer reviews previously transmitted emails without such an express determination step.

After all previous feedback data is received, at 304 the feedback data corresponding to the previously transmitted email to the consumer is analyzed. In addition to the information indicating the time at which the previously transmitted email was reviewed by the consumer, the feedback data may also include information identifying the promotion(s) that were included in the previously transmitted email, as well as any of the promotion(s) in the previously transmitted email that were purchased by the consumer.

At 305, a transmission time to transmit a subsequent email to the consumer is determined based on all the analyzed feedback data from 304. In some embodiments the transmission time will coincide with a time at which the previously transmitted email was reviewed by the consumer as identified by the feedback data in 304. For instance, if the feedback data indicates that the consumer reviewed the previous email at a certain time of the day, the transmission time for transmitting the subsequent email may be set to coincide with the certain time of the day. The transmission time may further be set to coincide with the same time period (e.g., day) as the time at which the consumer reviewed the pervious email, in addition to the set time (e.g., time of the day).

In addition or alternatively, the transmission time may be one of a mean, median or mode of the times at which the consumer reviewed previous emails as identified by the feedback data received at 303.

As previously described, the consumer may have one or more associated consumer sub-profiles. In such embodiments where the consumer is associated with more than one consumer sub-profile, the analysis at 304 may additionally include referencing the feedback data, and making a determination as to which consumer sub-profile the consumer reviewed the previously transmitted email from. For example, the consumer may have a work sub-profile and a home sub-profile. As discussed in more detail below, in the event that the feedback data indicates work hours, the analytical model 104 may note that the consumer reviews emails during work hours and may identify the appropriate consumer sub-profile (i.e., the work sub-profile). By determining the consumer sub-profile from which the consumer reviewed the previous email, the content of the subsequent email may be selected based on the identified consumer sub-profile (e.g., selecting lunch deals close to the consumer's work address when the work sub-profile is identified as the sub-profile the consumer reviews emails from).

For instance, the consumer's work sub-profile may be associated with a time period of 9:00 a.m. to 6:00 p.m. on a weekday. If the feedback data indicates that the previously transmitted email was reviewed by the consumer at a time in-between 9:00 a.m. to 6:00 p.m. on a weekday, the analysis at 202 may predict that, based on the feedback data, the more appropriate sub-profile to use when selecting the content of the subsequent email is the consumer's work sub-profile.

In addition, although the flow chart 300 is described as being applied to only an email type of electronic correspondence via an email communication channel, cross communication amongst different communication channels is contemplated. For example, by obtaining the feedback data indicating the time at which the consumer obtained the previous email at 301, at 305 a transmission time to transmit a subsequent electronic correspondence that is not an email may be determined. In this way, the transmission time that is determined based on the analyzed feedback data corresponding to a first type of electronic correspondence at 301, may correspond to a second type of electronic correspondence that is different from the first type of electronic correspondence. It follows that the subsequent generation of an electronic correspondence at 306 will be of an electronic correspondence type that matches the electronic correspondence type identified in the transmission time determined at 301.

So even though the feedback data received at 301 corresponds to a previous time the consumer received an email type of electronic correspondence, this feedback data may be referenced in order to determine a transmission time to transmit a subsequent electronic correspondence to the consumer at 305, where the subsequent electronic correspondence is not an email (e.g., webpage presentation of promotions). It also follows that the subsequent generation of an electronic correspondence at 306 may not be an email, but an electronic correspondence that corresponds to the electronic correspondence identified at 305. This may be because all types of electronic correspondences may be considered to be an impression on the consumer.

At 306, the subsequent email is generated. In some embodiments, the subsequent email may be generated to include one or more promotions that share one or more attributes with the time period corresponding to the transmission time determined at 305. In order to generate the subsequent email to include promotions that share one or more attributes with the transmission time, attributes describing the time period corresponding to the transmission time may be reviewed.

For instance, the transmission time determined at 305 may correspond to a morning time period. In this case, the morning time period may be reviewed and a determination may be made to identify morning time period related deals. Examples of morning time period related deals may include, but are not limited to, breakfast meal deals, early morning specials, coffee deals, early morning fight travel deals, or the like. In this way, the promotions that are included in the subsequent email at the transmission time that is during the morning time period may be related to the morning time period. By generating the subsequent email to include promotions that are related to the time period during which the subsequent email is transmitted to the consumer, the probability that the consumer may be interested in, and therefore purchase, the promotions may be increased.

In addition or alternatively, the promotion(s) that are selected for inclusion during the generation of the subsequent email at 306 may correspond to time-sensitive promotions that coincide with the transmission time for the subsequent email determined at 305. For instance, a promotion may be included in the subsequent email if the offer for the promotion expires shortly after the transmission time of the subsequent email. In the example discussed above in which the consumer reviews emails during the morning time period, the content of the subsequent email may include lunch time promotions which expire within a few hours from the time the email is transmitted to the consumer (e.g., at 1:00 p.m.). The time-sensitive promotion may be part of a time-sensitive promotion collection that includes promotions that are only available during a set period of time. In this way, the subsequent email may include a promotion from the time-sensitive promotion collection if the transmission time is within the set period of time.

And at 307, the subsequent email is transmitted to the consumer at the transmission time determined at 305. By transmitting the subsequent email based on the time at which the consumer previous reviewed (e.g., viewed or opened) the previous email, the likelihood that the consumer will also review the subsequent email may increase. This result is desirable to further increase the probability that the consumer will purchase a promotion that is included in the subsequent email.

Additionally, in the embodiments where the consumer is associated with more than one consumer sub-profile, the content of the subsequent email may be based on the determined sub-profile, as discussed at 304.

Figure 4:
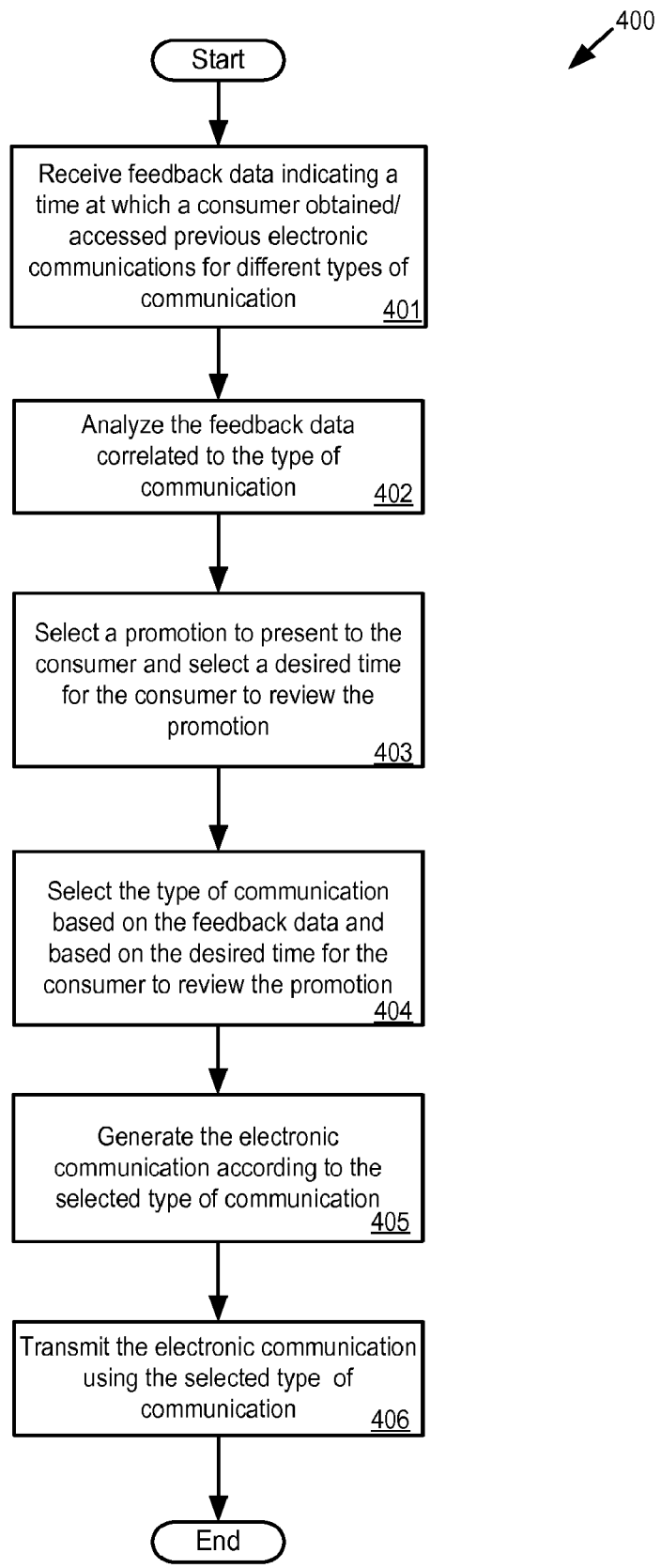
FIG. 4 illustrates a flow chart describing an overview of a process for analyzing one or more feedback data for determining a type of communication channel to transmit a subsequent electronic correspondence to a consumer.

FIG. 4 illustrates a flow chart 400 describing an overview of a process for analyzing one or more feedback data for determining a type of communication to transmit a subsequent electronic correspondence to a consumer. At 401, feedback is received indicating a time at which the consumer has obtained or accessed previous communications for different types of communication. For example, feedback may be generated for times at which the consumer opens an email, opens an SMS text, receives a real-time webpage content presentation, or the like.

At 402, the feedback data is analyzed and correlated to the type of communication. For example, the feedback data may be analyzed to determine a typical time at which the consumer accesses or opens the electronic communication for the different types of communication.

At 403, the promotion offering system 102 may select a promotion to present to the consumer, and select a desired time when the promotion offering system wishes for the consumer to review the promotion. The promotion may have a time-sensitivity. In this regard, the promotion offering system 102 may seek for the consumer to review a promotion at a desired access time, such as at 9:00 AM.

At 404, the promotion offering system 102 may select the type of communication in which to send the promotion based on the feedback data and based on the desired time for the consumer to review the promotion. In the example given wherein the desired access time is 10:00 AM, the promotion offering system 102 may determine which of the types of communication that the consumer typically accesses near or after the desired access time (e.g., the consumer accesses the promotion program website in order to obtain webpage content typically at 10:00 AM). In response to determining the type of communication that matches the desired access time, the promotion offering system 102 may select the determined type to send the promotion to the consumer (e.g., select sending the electronic communication with the promotion via real-time webpage content presentation to the consumer).

At 405, the promotion offering system 102 may generate the electronic communication according to the selected type of communication for transmission via the respective communication channel. For example, in the event that the selected type of communication is SMS text message, the promotion offering system 102 may format an SMS text message to send via an SMS text message communication channel, with the SMS text message including the information regarding the promotion.

At 406, the electronic communication using the selected type of communication is transmitted via the respective communication channel. The time of transmission may be at, or slightly before, the desired time for the consumer to review the promotion. Alternatively, the time of transmission may be at a time different from the desired time for the consumer to review the promotion.

Figure 5:
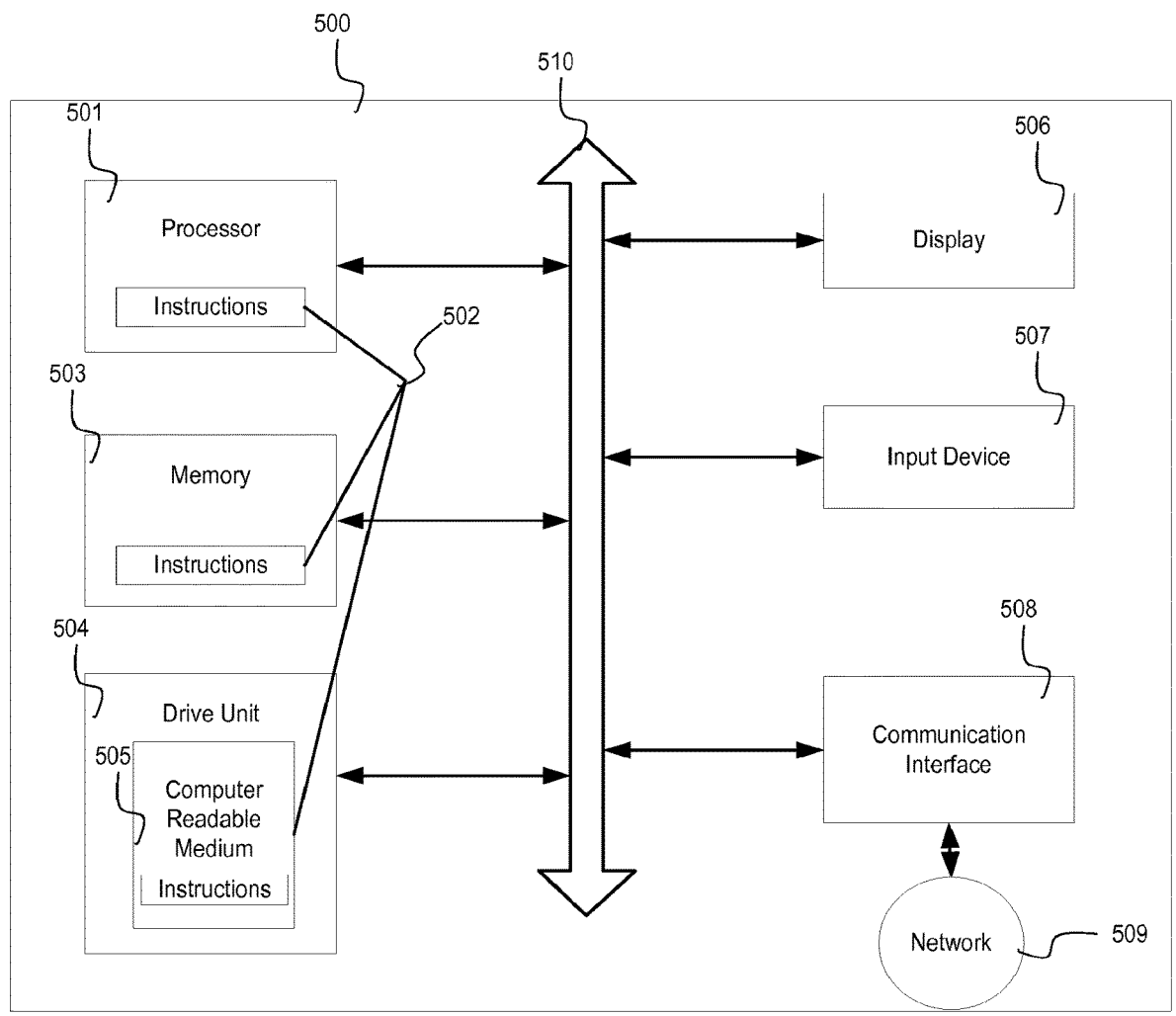
FIG. 5 is a general computer system, programmable to be a specific computer system, which may represent any of the computing devices referenced herein.

FIG. 5 illustrates a general computer system 500, programmable to be a specific computer system 500, which can represent any server, computer or component, such as consumer 1 (124), consumer N (126), merchant 1 (118), merchant M (120), and promotion offering system 102. The computer system 500 may include an ordered listing of a set of instructions 502 that may be executed to cause the computer system 500 to perform any one or more of the methods or computer-based functions disclosed herein. The computer system 500 can operate as a stand-alone device or can be connected, e.g., using the network 122, to other computer systems or peripheral devices.

In a networked deployment, the computer system 500 can operate in the capacity of a server or as a client-user computer in a server-client user network environment, or as a peer computer system in a peer-to-peer (or distributed) network environment. The computer system 500 may also be implemented as or incorporated into various devices, such as a personal computer or a mobile computing device capable of executing a set of instructions 502 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 500 can include a memory 503 on a bus 510 for communicating information. Code operable to cause the computer system to perform any of the acts or operations described herein can be stored in the memory 503. The memory 503 may be a random-access memory, read-only memory, programmable memory, hard disk drive or any other type of volatile or non-volatile memory or storage device.

The computer system 500 can include a processor 501, such as a central processing unit (CPU) and/or a graphics processing unit (GPU). The processor 501 may include one or more general processors, digital signal processors, application specific integrated circuits, field programmable gate arrays, digital circuits, optical circuits, analog circuits, combinations thereof, or other now known or later-developed devices for analyzing and processing data. The processor 501 may implement the set of instructions 502 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 500 can also include a disk or optical drive unit 504. The disk drive unit 504 may include a computer-readable medium 505 in which one or more sets of instructions 502, e.g., software, may be embedded. Further, the instructions 502 may perform one or more of the operations as described herein. The instructions 502 may reside completely, or at least partially, within the memory 503 or within the processor 501 during execution by the computer system 500. Accordingly, the databases 110, 112, 114, or 116 may be stored in the memory 503 or the disk unit 504.

The memory 503 and the processor 501 also may include computer-readable media as discussed above. A "computer-readable medium," "computer-readable storage medium," "machine readable medium," "propagated-signal medium," or "signal-bearing medium" may include any device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 500 may include an input device 507, such as a keyboard or mouse, configured for a user to interact with any of the components of system 500. It may further include a display 506, such as a liquid crystal display (LCD), a cathode ray tube (CRT), or any other display suitable for conveying information. The display 506 may act as an interface for the user to see the functioning of the processor 501, or specifically as an interface with the software stored in the memory 503 or the drive unit 504.

The computer system 500 may include a communication interface 508 that enables communications via the communications network 122. The network 122 may include wired networks, wireless networks, or combinations thereof. The communication interface 508 network may enable communications via any number of communication standards, such as 802.11, 802.17, 802.20, WiMax, 802.15.4, cellular telephone standards, or other communication standards, as discussed above. Simply because one of these standards is listed does not mean any one is preferred.

Further, the promotion offering system 102, as depicted in FIG. 1 may comprise one computer system or multiple computer systems. Further, the flow diagrams illustrated in the Figures may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. An apparatus comprising a processor and a non-transitory memory storing program instructions, wherein the non-transitory memory and the program instructions are configured to, with the processor, cause the apparatus to:
    determine, by a server, feedback data associated with a consumer profile and comprising at least a plurality of channel access time attributes associated with a plurality of communication channels on a client device, wherein the at least the plurality of channel time attributes comprises:
        one or more first time attributes indicating when one or more previous electronic correspondences were accessed on the client device based on server access time associated with the one or more previous electronic correspondences, and
        one or more second time attributes indicating when links in the one or more previous electronic correspondences were accessed based on second server access time associated with the links;
    prior to transmitting a first electronic correspondence to the client device, determine, by the server, a first desired access time attribute associated with one or more promotion indications in the first electronic correspondence;
    select, by the server and based at least in part on the plurality of channel access time attributes and the first desired access time attribute, a first communication channel from the plurality of communication channels;
    transmit, by the server, the first electronic correspondence to the client device via the first communication channel;
    prior to transmitting a second electronic correspondence to the client device, determine, by the server, a second desired access time attribute associated with one or more promotion indications in the second electronic correspondence;
    select, by the server and based at least in part on the plurality of channel access time attributes and the second desired access time attribute, a second communication channel from the plurality of communication channels, wherein the second communication channel is different from the first communication channel; and
    transmit, by the server, the second electronic correspondence to the client device via the second communication channel.

2. The apparatus of claim 1, wherein the plurality of communication channels comprise an electronic mail communication channel, a web page communication channel, and a mobile application communication channel.

3. The apparatus of claim 1, wherein the one or more promotion indications comprise at least one time sensitive promotion indication, wherein the second desired access time attribute is associated with the at least one time sensitive promotion indication.

4. The apparatus of claim 1, wherein the non-transitory memory and the program instructions are configured to, with the processor, cause the apparatus to:
    determine a most frequent purchase time attribute associated with the one or more promotion indications, wherein the second desired access time attribute corresponds to the most frequent purchase time attribute.

5. The apparatus of claim 1, wherein the non-transitory memory and the program instructions are configured to, with the processor, cause the apparatus to:
    receive other feedback data associated with one or more other consumer profiles;
    determine that the one or more other consumer profiles and the consumer profile share at least one common attribute;
    determine one or more other desired access time attributes associated with the one or more other consumer profiles; and
    determine one of the one or more other desired access time attributes as the second desired access time attribute.

6. The apparatus of claim 1, wherein the second desired access time attribute is based on one of the one or more first time attributes or the one or more second time attributes.

7. A computer-implemented method comprising:
    determining, by a server, feedback data associated with a consumer profile and comprising at least a plurality of channel access time attributes associated with a plurality of communication channels on a client device, wherein the at least the plurality of channel time attributes comprises:
        one or more first time attributes indicating when one or more previous electronic correspondences were accessed on the client device based on server access time associated with the one or more previous electronic correspondences, and
        one or more second time attributes indicating when links in the one or more previous electronic correspondences were accessed based on second server access time associated with the links;
    prior to transmitting a first electronic correspondence to the client device, determine, by the server, a first desired access time attribute associated with one or more promotion indications in the first electronic correspondence;

select, by the server and based at least in part on the plurality of channel access time attributes and the first desired access time attribute, a first communication channel from the plurality of communication channels;

transmit, by the server, the first electronic correspondence to the client device via the first communication channel;

prior to transmitting a second electronic correspondence to the client device, determine, by the server, a second desired access time attribute associated with one or more promotion indications in the second electronic correspondence;

select, by the server and based at least in part on the plurality of channel access time attributes and the second desired access time attribute, a second communication channel from the plurality of communication channels, wherein the second communication channel is different from the first communication channel; and transmit, by the server, the second electronic correspondence to the client device via the second communication channel.

8. The computer-implemented method of claim 7, wherein the plurality of communication channels comprise an electronic mail communication channel, a web page communication channel, and a mobile application communication channel.

9. The computer-implemented method of claim 7, wherein the one or more promotion indications comprise at least one time sensitive promotion indication, wherein the second desired access time attribute is associated with the at least one time sensitive promotion indication.

10. The computer-implemented method of claim 7, further comprising:
determining a most frequent purchase time attribute associated with the one or more promotion indications, wherein the second desired access time attribute corresponds to the most frequent purchase time attribute.

11. The computer-implemented method of claim 7, further comprising receiving other feedback data associated with one or more other consumer profiles;
determining that the one or more other consumer profiles and the consumer profile share at least one common attribute;
determining one or more other desired access time attributes associated with the one or more other consumer profiles; and
determining one of the one or more other desired access time attributes as the second desired access time attribute.

12. The computer-implemented method of claim 7, wherein the second desired access time attribute is based on one of the one or more first time attributes or the one or more second time attributes.

13. A computer program product comprising at least one non-transitory computer-readable storage medium having computer-readable program code portions stored therein, the computer-readable program code portions comprising an executable portion configured to:
determine, by a server, feedback data associated with a consumer profile and comprising at least a plurality of channel access time attributes associated with a plurality of communication channels on a client device, wherein the at least the plurality of channel time attributes comprises:

one or more first time attributes indicating when one or more previous electronic correspondences were accessed on the client device based on server access time associated with the one or more previous electronic correspondences, and one or more second time attributes indicating when links in the one or more previous electronic correspondences were accessed based on second server access time associated with the links;

prior to transmitting a first electronic correspondence to the client device, determine, by the server, a first desired access time attribute associated with one or more promotion indications in the first electronic correspondence;

select, by the server and based at least in part on the plurality of channel access time attributes and the first desired access time attribute, a first communication channel from the plurality of communication channels;

transmit, by the server, the first electronic correspondence to the client device via the first communication channel;

prior to transmitting a second electronic correspondence to the client device, determine, by the server, a second desired access time attribute associated with one or more promotion indications in the second electronic correspondence;

select, by the server and based at least in part on the plurality of channel access time attributes and the second desired access time attribute, a second communication channel from the plurality of communication channels, wherein the second communication channel is different from the first communication channel; and transmit, by the server, the second electronic correspondence to the client device via the second communication channel.

14. The computer program product of claim 13, wherein the plurality of communication channels comprise an electronic mail communication channel, a web page communication channel, and a mobile application communication channel.

15. The computer program product of claim 13, wherein the one or more promotion indications comprise at least one time sensitive promotion in dication, wherein the second desired access time attribute is associated with the at least one time sensitive promotion indication.

16. The computer program product of claim 13, wherein the computer-readable program code portions comprises the executable portion configured to:
determine a most frequent purchase time attribute associated with the one or more promotion indications, wherein the second desired access time attribute corresponds to the most frequent purchase time attribute.

17. The computer program product of claim 13, wherein the computer-readable program code portions comprises the executable portion configured to
receive other feedback data associated with one or more other consumer profiles;
determine that the one or more other consumer profiles and the consumer profile share at least one common attribute;
determine one or more other desired access time attributes associated with the one or more other consumer profiles; and
determine one of the one or more other desired access time attributes as the second desired access time attribute.

* * * * *

UNITED STATES PATENT AND TRADEMARK OFFICE
CERTIFICATE OF CORRECTION

| | | |
|---|---|---|
| PATENT NO. | : 12,211,066 B2 | Page 1 of 1 |
| APPLICATION NO. | : 17/445552 | |
| DATED | : January 28, 2025 | |
| INVENTOR(S) | : Chris Trimble et al. | |

It is certified that error appears in the above-identified patent and that said Letters Patent is hereby corrected as shown below:

On the Title Page

In Column 1, item (72), Inventors, Line 2, delete "Freemont," and insert -- Fremont, --, therefor.

In the Claims

In Column 24, Line 43, Claim 15, delete "in dication," and insert -- indication, --, therefor.

Signed and Sealed this
Second Day of September, 2025

Coke Morgan Stewart
*Acting Director of the United States Patent and Trademark Office*